United States Patent
Loon et al.

(10) Patent No.: US 8,599,845 B2
(45) Date of Patent: Dec. 3, 2013

(54) SOFTWARE-ASSISTED VLAN AGING TIMER SCHEME FOR DISTRIBUTED SWITCHING SYSTEMS

(75) Inventors: Melvin Tan Wee Loon, Plano, TX (US); Vibha Chhatwal Sarin, Plano, TX (US); Bijendra Singh, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 603 days.

(21) Appl. No.: 12/755,853

(22) Filed: Apr. 7, 2010

(65) Prior Publication Data
US 2011/0249673 A1 Oct. 13, 2011

(51) Int. Cl.
*H04L 12/28* (2006.01)
*H04L 12/56* (2011.01)

(52) U.S. Cl.
CPC ..................................... *H04L 45/00* (2013.01)
USPC .......... 370/389; 370/351; 370/395.1; 370/396

(58) Field of Classification Search
None
See application file for complete search history.

(56) References Cited

U.S. PATENT DOCUMENTS

| | | | | |
|---|---|---|---|---|
| 5,978,951 A | * | 11/1999 | Lawler et al. | 714/758 |
| 8,040,872 B2 | * | 10/2011 | Saito et al. | 370/351 |
| 8,295,282 B2 | * | 10/2012 | Schlenk | 370/392 |
| 2002/0051450 A1 | * | 5/2002 | Ganesh et al. | 370/389 |
| 2006/0036765 A1 | * | 2/2006 | Weyman | 709/245 |
| 2006/0092860 A1 | * | 5/2006 | Higashitaniguchi et al. | 370/255 |
| 2007/0162595 A1 | * | 7/2007 | Samprathi | 709/224 |
| 2010/0238811 A1 | * | 9/2010 | Rune | 370/248 |
| 2010/0271980 A1 | * | 10/2010 | Kini et al. | 370/256 |

* cited by examiner

*Primary Examiner* — Ayaz Sheikh
*Assistant Examiner* — Peter Chau
(74) *Attorney, Agent, or Firm* — Baker Botts L.L.P.

(57) ABSTRACT

A network processing unit includes a first table, a forwarding table, and a processor. The first table includes a first entry for a network, including a network aging, which includes the network processing unit. The forwarding table includes a second entry associated with a network entity which includes an indication of whether network traffic associated with the entity has been encountered in the current or previous network aging period. The processor is configured to receive an indication from a hardware timer that a hardware aging cycle has ended, and then determine whether the network aging period has ended. If so, the processor is configured to determine for a first network entity in the forwarding table whether traffic associated with the entity has been encountered in the current or previous network aging period. If not, then the processor is configured to remove the given first network entity from the forwarding table.

20 Claims, 5 Drawing Sheets

SOFTWARE-ASSISTED VLAN AGING TIMER SCHEME FOR DISTRIBUTED SWITCHING SYSTEMS

TECHNICAL FIELD OF THE INVENTION

The present invention relates generally to networked communications and, more particularly, to a software-assisted aging timer scheme for distributed switching systems.

BACKGROUND

In distributed switching systems, switching entities such as Network Processing Units ("NPUs") independently perform information forwarding, forwarding entry learning, and aging out of forwarding entries. Aging out of forwarding entries requires complex hardware circuitry because switches such as metro Ethernet switches may be associated with a very large number of Virtual Local Area Networks ("VLANs"), and each VLAN may have its own aging timer set by the operator. A VLAN may span any number of switching units and aging may need to be performed uniformly across NPUs within the same VLAN. Aging timer mechanisms in hardware can be very complex in distributed switch systems, meaning that many switching systems offer constrained aging functionality.

SUMMARY

In one embodiment, a network processing unit includes a first table, a forwarding table, and a processor. The first table includes a first entry for a network. The first entry includes a network aging period associated with the network. The network includes the network processing unit. The forwarding table includes a second entry. The second entry is associated with a network entity and includes an indication of whether network traffic associated with the network entity has been encountered in the current or previous network aging period. The processor is configured to receive an indication from a hardware timer that a hardware aging cycle has ended. Upon receiving the indication from the hardware timer, the processor is configured to determine, for one or more networks, whether the network aging period has ended. If the network aging period for a given network has ended, the processor is configured to determine whether, for one or more first network entities listed in the forwarding table associated with the given network, whether traffic associated with the given first network entity has been encountered in the current or previous network aging period. If traffic associated with a given first network entity has not been encountered in either the current or previous network aging period, then the processor is configured to remove the given first network entity from the forwarding table.

In a further embodiment, a method for networked communications includes the step of receiving an indication from a hardware timer that a hardware aging cycle has ended. The method includes the step of, upon receiving the indication from the hardware timer, accessing a first table to determine, for one or more networks, an aging period associated with the network. The method also includes the step of, if the network aging period for a given network has ended, determining whether, for one or more first network entities listed in a forwarding table associated with the given network, whether traffic associated with the given first network entity has been encountered in the current or previous network aging period. The method also includes the step of, if traffic associated with a given first network entity has not been encountered in either the current or previous network aging period, then removing the given first network entity from the forwarding table. The forwarding table includes a second entry.

In yet a further embodiment, an article of manufacture includes a computer readable medium and computer-executable instructions carried on the computer readable medium. The instructions are instructions readable by a processor. The instructions, when read and executed, cause the processor to receive an indication from a hardware timer that a hardware aging cycle has ended. The processor is also caused to, upon receiving the indication from the hardware timer, access a first table to determine, for one or more networks, an aging period associated with the network. The processor is also caused to, if the network aging period for a given network has ended, determine whether, for one or more first network entities listed in a forwarding table associated with the given network, whether traffic associated with the given first network entity has been encountered in the current or previous network aging period, the forwarding table comprising a second entry. The processor is also caused to, if traffic associated with a given first network entity has not been encountered in either the current or previous network aging period, then remove the given first network entity from the forwarding table.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
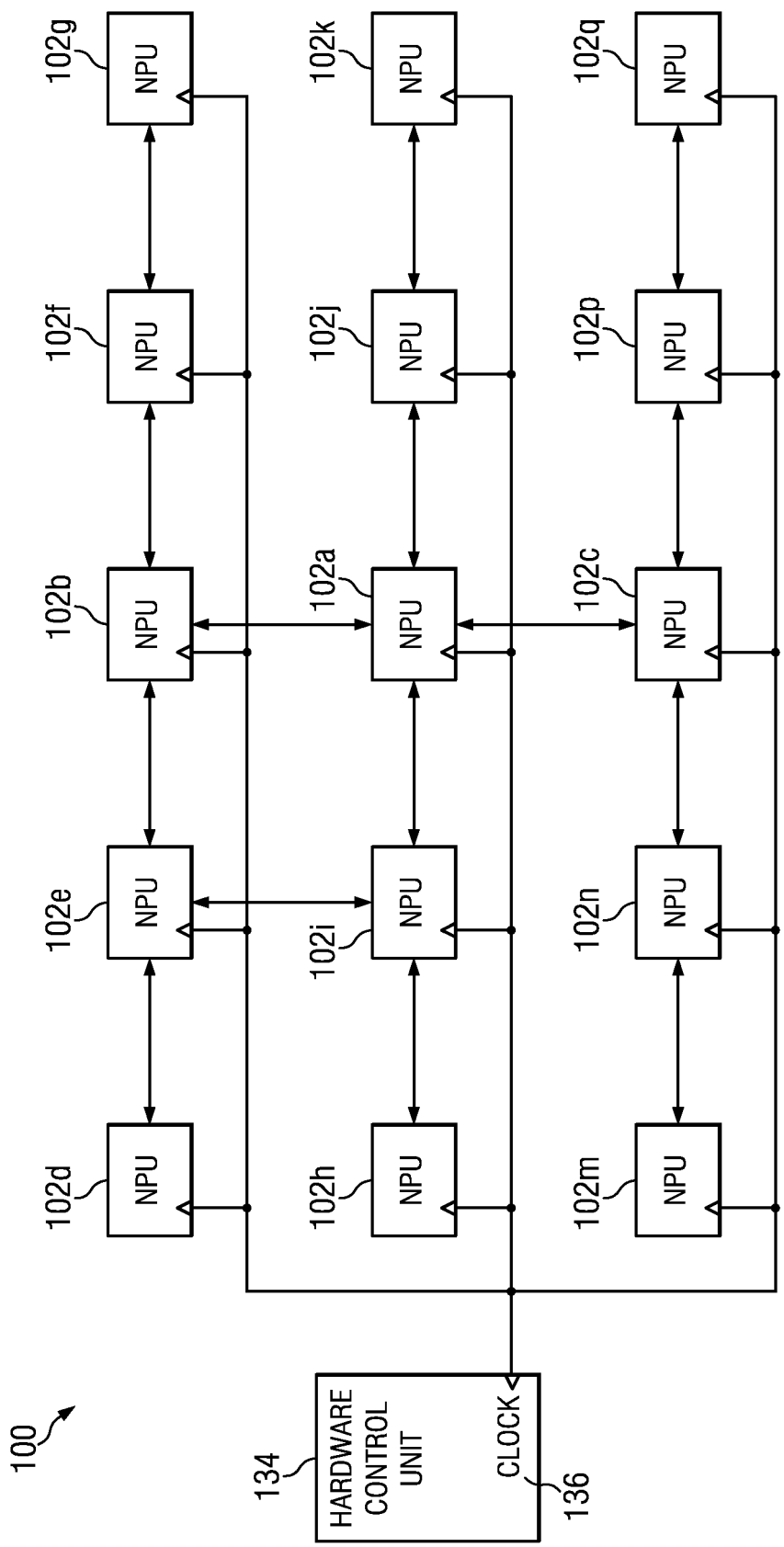
FIG. 1 is an illustration of an example embodiment of a distributed switching system utilizing a software assisted VLAN aging timer scheme.

FIG. 1 is an example embodiment of a distributed switching system 100 utilizing a software-assisted VLAN aging timer scheme. Distributed switching system 100 may comprise one or more networks configured for sharing information between various electronic devices. Distributed switching system 100 may comprise one or more network processing units ("NPU") 102. An NPU 102 may be associated with a network entity. The network entity may be coupled to NPU 102. In one embodiment, the network entity may comprise one or more NPUs 102. NPUs may be configured to independently perform information forwarding to other NPUs or their associated network entities, including tracking the existence of and connections to other NPUs and their associated network entities in forwarding tables. Such tracking may comprise learning of other NPUs and associated network entities, storing information about the NPUs and associated network entities in the forwarding table, and aging out forwarding entries when communication between NPUs has ceased for a time. Each of NPUs 102 may be communicatively coupled to one or more other NPUs 102. NPUs 102 may be communicatively coupled to each other in a variety of network topologies, including line, tree, star, ring, bus, or fully connected. Each of NPUs 102 may be configured to receive information, determine the next destination for the information, and subsequently transfer the information to another NPU. Transmission of information may originate or terminate from or at one of NPUs 102, or from or at a device coupled to one of NPUs 102. Each of NPUs 102 may comprise a switch. Each of NPUs 102 may reside on a device with one or more other NPUs.

Distributed switching system 100 may comprise a hardware control unit 134. Each of NPUs 102 may be coupled to hardware control unit 134. Hardware control unit 134 may be configured to provide a clock signal 136 to each of NPUs 102 in distributed switching system. NPUs 102 may thus be configured to be synchronized with each other.

An NPU 102 may be configured to learn the information about another NPU or its associated network entity while receiving and forwarding packets of information. Such may information may include, but is not limited to, an address, a port, and an associated VLAN. The address may comprise any suitable indication of how information may be forwarded to a network destination, including but not limited to an actual network address, a MAC address, the network route to take to reach the NPU, the address of an intermediate network destination. The address may be taken from a source address of an NPU or its associated network entity sending the packet, a destination address of an NPU or its associated network entity that is to receive the packet, or an address of an NPU or its associated network entity within the path to either the source or destination. The port may comprise an identification of a port comprising or coupled to an NPU configured to send or receive packets. The port may be learned from the identification in the packet of the port associated with an NPU that sent the packet, or from an identification in the packet of the port associated with an NPU that is to receive the packet. The VLAN may be learned from the information in a packet concerning over which VLAN the packet is to travel. An NPU 102 may be configured to store the information about of another NPU or its associated network entity for use when receiving and forwarding packets. Because the connection between two NPUs 102 may be temporary, become disabled, or otherwise become unavailable, an NPU 102 may be configured to cause the information of another NPU 102 to expire after a period of inactivity.

Figure 2:
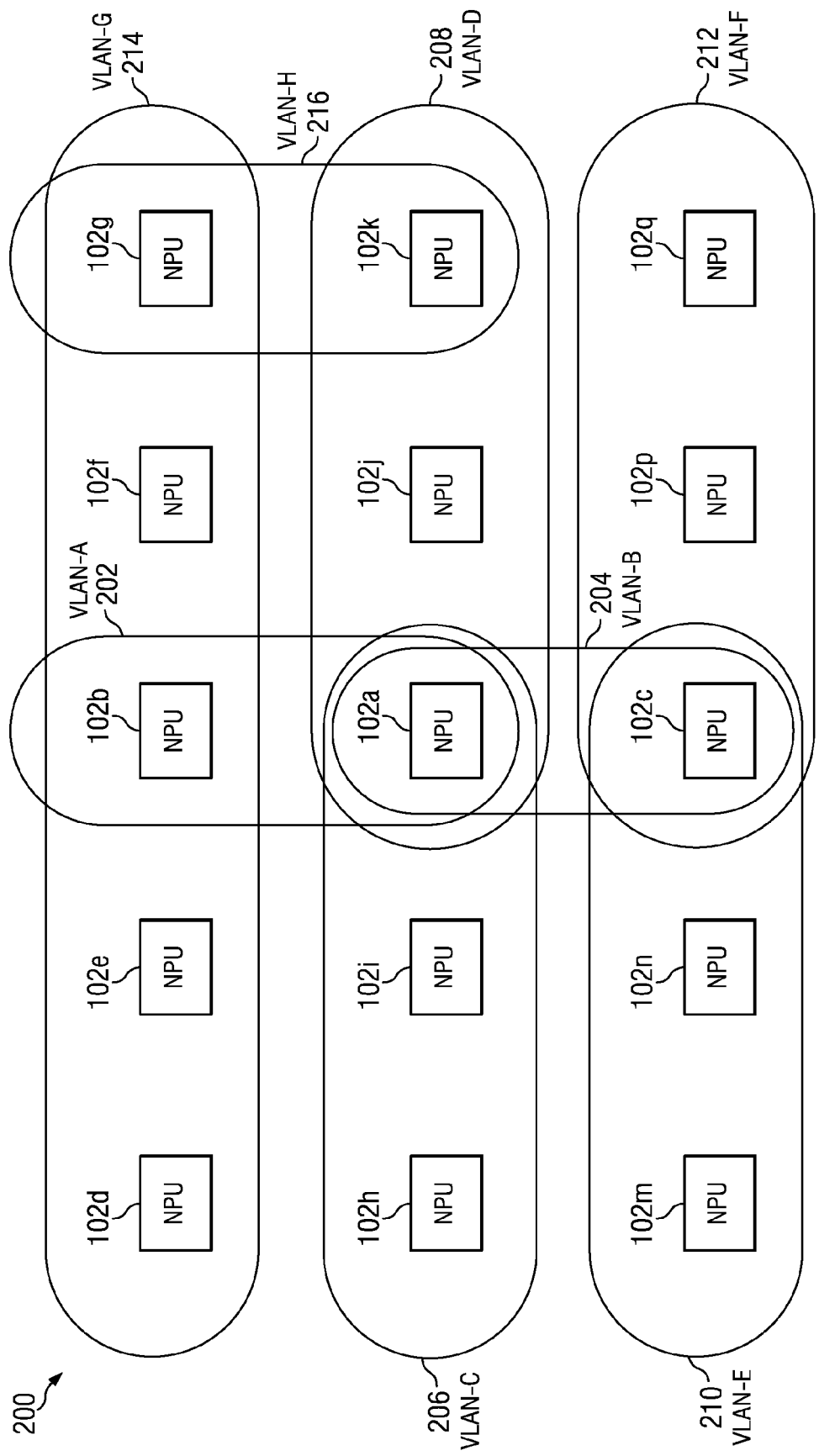
FIG. 2 is an illustration of an example of how NPUs of the distributed switching system may be organized into one or more VLANs.

FIG. 2 is an illustration of an example of how in distributed switching system 100, one or more Virtual Local Area Networks ("VLAN") may span across one or more NPUs. Distributed switching system 100 may comprise one or more VLANs 202-216. A VLAN may comprise one or more of NPUs 102. Any one of NPUs 102 may be a part of one or more VLANs. An NPU may be dynamically removed from a VLAN or added to a VLAN. For example, VLAN-A 202 may comprise NPUs 102a, 102b; VLAN-B 204 may comprise NPUs 102a, 102b; VLAN-C 206 may comprise NPUs 102a, 102h, 102i; VLAN-D 208 may comprise NPUs 102, 102j, 102k; VLAN-E 210 may comprise NPUs 102c, 102m, 102n; VLAN-F 212 may comprise NPUs 102c, 102p, 102q; VLAN-G 214 may comprise NPUs 102b, 102d, 102e, 102f, 102g; and VLAN-H 216 may comprise NPUs 102g, 102k.

An individual VLAN may comprise a time period for which all the NPUs 102 within the VLAN will apply when determining how often to evaluate whether known connections to other NPUs 102 or associated network entities listed in a forwarding table are sufficiently out-of-date to be removed. The time period may be configured for each VLAN, such that aging is performed uniformly across NPUs within the same VLAN.

Figure 3:
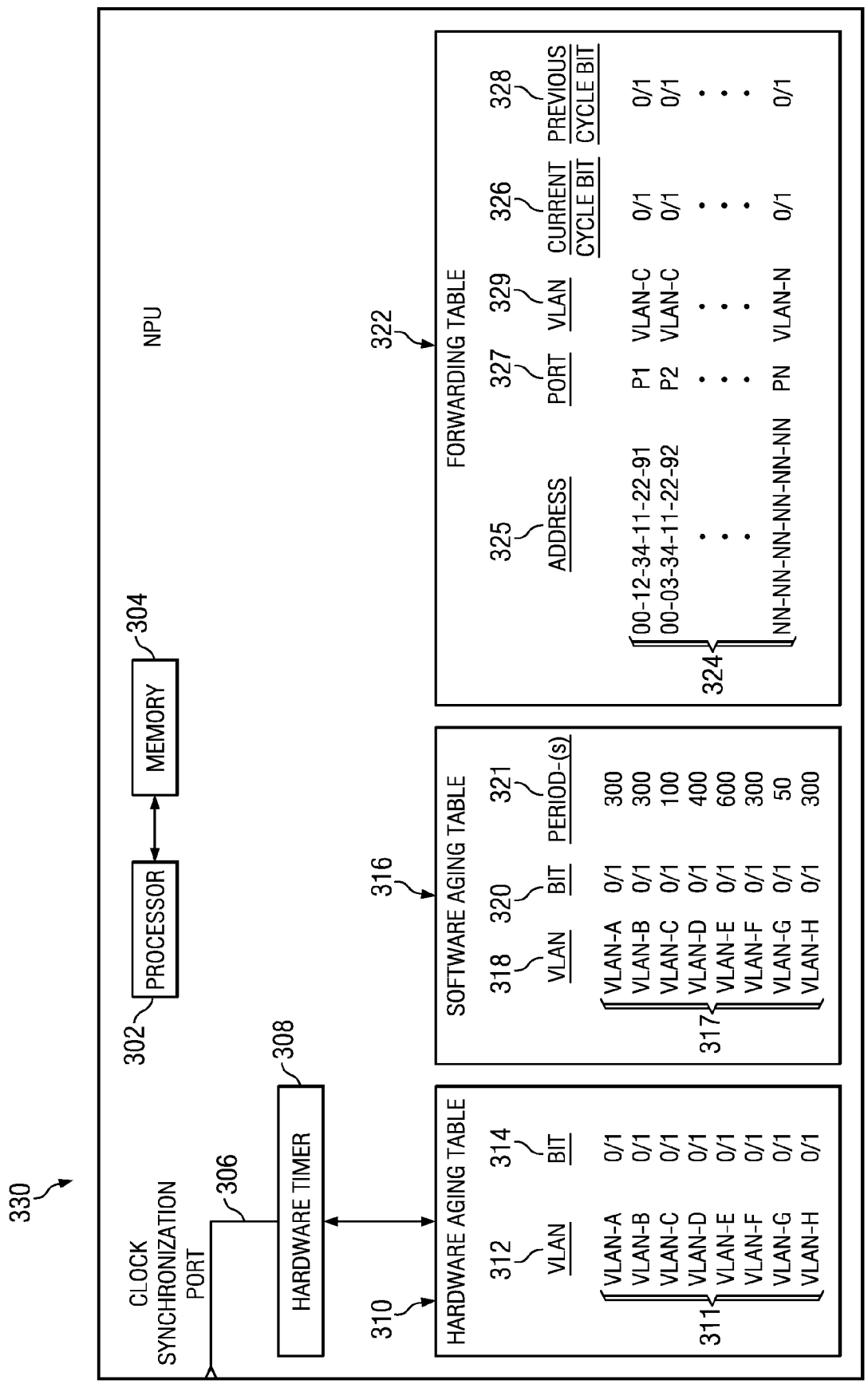
FIG. 3 is an illustration of an example embodiment of an NPU utilizing a software-assisted 1-bit per VLAN aging timer scheme.

FIG. 3 is an illustration of an example embodiment of an NPU 330 utilizing a software-assisted 1-bit per VLAN aging timer scheme. NPU 330 may be configured to apply a scheme for aging a VLAN timer with a single bit and software, according to the present disclosure. NPU 330 may comprise one of the NPUs 102 of FIGS. 1 and 2. NPU 330 may comprise a processor 302 coupled to a memory 304. NPU 330 may comprise a clock synchronization port 306 coupled to a hardware timer 308. Clock synchronization port 306 and hardware timer 308 may be operable to synchronize NPU 330 with other NPUs 102 in distributed switch system 100. Hardware timer 308 may be configured to keep time of a certain period, and when the length of time is reached, notify the elements of NPU 330. The period of hardware timer 308 may be based on the resolution granularity of the lowest aging time required by an NPU or VLAN in distributed switching system 100. The period of hardware timer 308 may be relatively short. In one embodiment, the period of hardware timer 308 may be ten seconds.

Processor 302 may comprise, for example, a microprocessor, microcontroller, digital signal processor (DSP), application specific integrated circuit (ASIC), or any other digital or analog circuitry configured to interpret and/or execute program instructions and/or process data. Processor 302 may interpret and/or execute program instructions and/or process data stored in memory 304. Memory 304 may comprise any system, device, or apparatus configured to hold and/or house one or more memory modules. Each memory module may include any system, device or apparatus configured to retain program instructions and/or data for a period of time (e.g., computer-readable media).

NPU 330 may comprise a hardware aging table 310. Hardware aging table 310 may be implemented partially or fully in hardware in NPU 330. In one embodiment, hardware aging table 310 may be implemented partially or fully by processor 302. Hardware aging table 310 may be coupled to hardware timer 308. Hardware aging table 310 may comprise a list of entries 311 representing possible VLANs existing in distributed switching system 100. In one embodiment, each of VLANs in distributed switching system 100 may be represented by an entry 311. Each of entries 311 may comprise an indication 312 of an associated VLAN and a bit 314. Bit 314 may be configured as a binary, having a value of either "0" or "1." Bit 314 may be implemented by any suitable indicator capable of distinguishing between two different states, including but not limited to, a hardware bit, flag, Boolean, data structure, or register. NPU 330 may be operable to set bit 314 based upon inputs from other entities. In one embodiment, bit 314 may operable to be set based upon inputs from hardware timer 308. NPU 330 may be configured to set the bit 314, for example, to "0", of a given VLAN upon reception of notification from hardware timer 308 that its period has been reached. Hardware aging table 310 may be configured such that if a bit corresponding to a given VLAN is set to "0," it is implied that the hardware aging for that VLAN has run its cycle and aging action may need to be taken for the VLAN. NPU 330 may be configured to set bit 314 of a given VLAN to "1" once NPU 330 has evaluated whether aging action needs to be taken for the VLAN.

NPU 330 may comprise a software aging table 316. Software aging table 316 may be implemented partially in hardware in NPU 330. Software aging table 316 may be operable by logic or instructions contained within memory 304, and executed by processor 304. Software aging table 316 may comprise a list of entries 317 representing possible VLANs existing in distributed switching system 100. In one embodiment, all VLANs in distributed switching system 100 may be represented by entries 317. In another embodiment, all VLANs for which NPU 330 is a member may be represented by entries 317.

Each of entries 317 may comprise an indication 318 of an associated VLAN, a bit 320, and a period 321. Bit 320 may be configured as a binary bit, having a value of either "0" or "1". Bit 320 may be implemented by any suitable indicator capable of distinguishing between two different states, including but not limited to, a hardware bit, flag, Boolean, data structure, or register. Each of entries 317 may comprise a period 321. Period 321 may be configured to provide an indication of the length of time for NPU 330 to wait before resetting entries 321 in software aging table 316. Period 321 may be configured to be a common value to all NPUs within a given VLAN. Period 321 may comprise a network aging period. In one embodiment, period 321 may comprise a multiple of the period of hardware timer 308.

NPU 330 may be configured to set bit 320 based upon inputs from other elements of NPU 330. In one embodiment, bit 320 may be operable to be set based upon inputs from hardware timer 308. In another embodiment, bit 320 may be operable to be set based upon logic and/or instructions residing in memory 304 and executed by processor 302. In yet another embodiment, bit 320 may be operable to be set based upon the period 321 associated with the entry.

NPU 330 may be configured to set bit 320 at the end of period 321 of a given VLAN entry 317 if the period 321 of the given VLAN entry 317 has been reached. In one embodiment, NPU 330 may be configured to evaluate whether period 321 has expired upon notification by hardware timer 308 that the hardware timer 308 has expired. In another embodiment, NPU 330 may be configured determine the number of iterations of the hardware timer 308 period that comprise the period 321 of a VLAN entry 317 of the software aging table 316. In such an embodiment, NPU 330 may be configured to set bit 320 upon reaching the requisite number of iterations of indications from hardware timer 308 that hardware timer 308 has reached the end of hardware timer period. Thus, every VLAN in distributed system 100 may be configured to comprise its own aging timer based upon the hardware timer 308.

In one embodiment, bit 320 may be configured so that a value of "0" indicates the period 321 has been reached. In another embodiment, bit 320 may be configured so that a value of "1" indicates that the period 321 has not been reached. After a period 321 has been reached, NPU 330 may be configured to evaluate whether aging action is required for the VLAN. After evaluating whether aging action is required for the VLAN, NPU 330 may be configured to reset to bit 320 to "1."

NPU 330 may comprise a forwarding table 322. Forwarding table 322 may be implemented in any suitable manner to store and make available to NPU 330 information concerning other network entities in distributed switching system 100. Forwarding table 322 may comprise information about NPUs that may span multiple VLANs. For example, in one embodiment NPU 330 may comprise a forwarding table 322 for all VLANs in distributed switching system 100.

In one embodiment, forwarding table 322 may be implemented partially or fully in hardware in NPU 330. In such an embodiment, forward entry table 310 may be implemented partially or fully by processor 302. In another embodiment, forward entry table 322 may be implemented partially or fully in memory 304. Forwarding table 322 may be operable by logic or instructions contained within memory 304, and executed by processor 304.

Forwarding table 322 may be configured to track all other NPUs or their associated network entities in a given VLAN. In one embodiment, forwarding table 322 may be configured to track all network entities in a given VLAN of which NPU 330 is aware and which are active. Each of entries 324 may comprise an address 325 of a network entity associated with the entry, a port 327 accessible to the network entity, a VLAN 329 over which the network entity communicates, a current cycle bit 326, and a previous cycle bit 328. Address 325 of a network entity may correspond to a network entity coupled to another NPU in distributed switching system 100. Address 325 may comprise a MAC address, hash of an address, or any other suitable identification of an NPU. Port 327 may comprise information about a port associated with the network entity that may comprise a network port by which the network entity may be accessed. VLAN 329 may comprise information identifying by which VLAN the network entity communicates.

Current cycle bit 326 and previous cycle bit 328 may each be configured as a binary bit, having a value of either "0" or "1". Current cycle bit 326 and previous cycle bit 328 may each be implemented by any suitable indicator capable of distinguishing between two different states, including but not limited to, a hardware bit, flag, Boolean, data structure, or register. In one embodiment, current cycle bit 326 and previous cycle bit 328 may be operable to be set by NPU 330 based upon inputs from hardware timer 308. In another embodiment, current cycle bit 326 and previous cycle bit 328 may be operable to be set based upon logic and/or instructions residing in memory 304 and executed by processor 302. NPU 330 may be configured to set current cycle bit 326 if, during the present aging cycle, NPU 330 has received a packet associated with an entry 324. An aging cycle may comprise the period of time for which a given VLAN will evaluate whether aging action needs to be taken. At the beginning or end of an aging cycle, NPU 330 may be configured to reset current cycle bit 326. In one embodiment, a "1" value of current cycle bit 326 may indicate that a packet associated with the entry 324 has been received during the present aging cycle. In another embodiment, a "0" value of current cycle bit 326 may indicate that a packet associated with the entry 324 has not been received during the present aging cycle. NPU 330 may be configured to set previous cycle bit 328 if NPU 330 received a packet associated with forwarding entry 324 during the previous aging cycle. At the end of an aging cycle, NPU 330 may be configured to set the previous cycle bit 328 according to the value of the present cycle bit 326. In one embodiment, a "1" value of previous cycle bit 328 may indicate that a packet associated with the entry 324 was received during the previous aging cycle. In another embodiment, a "0" value of previous cycle bit 328 may indicate that a packet associated with the entry 324 was not received during the previous aging cycle.

NPU 330 may be configured to add entries 324 in forwarding table 322 as NPU 330 receives packets of information associated with another NPU or associated network entity for which no entry exists in forwarding table 322. NPU 330 may be configured to set the current cycle bit 326 and previous cycle bit 328 for entries 324 that NPU 330 adds to forwarding table 322.

NPU 330 may be configured to conduct aging action upon the expiration of hardware timer 308. Aging action may comprise determining whether entries in forwarding table 322 should be deleted because communication with the network entities associated with entries 324 has ceased. Upon expiration of hardware timer 308, NPU may be configured to conduct aging action for the entries 324 associated with a given VLAN in forwarding table 322 if both hardware aging table 310 and software aging table 316 indicate that aging action may be required for the given VLAN. In one embodiment, NPU 330 may be configured to conduct aging action for the entries 324 associated with a given VLAN 324 if both bit 314 and bit 320 for the given VLAN are set to "0". NPU 330 may be configured to conduct aging action partially or fully in hardware.

When conducting aging action for the entries 324 associated with a given VLAN 324, NPU 330 may be configured to determine, for each of entries 324 whether the NPU 330 has not received a packet associated with the entry 324 in either the current or previous aging cycle. In one embodiment, if both current cycle bit 326 and previous cycle bit 328 are set to "0", then NPU 330 may be configured to determine that NPU 330 has not received a packet associated with the entry 324 in either the current or previous aging cycle. If NPU 330 has not received a packet associated with the entry 324 in either the current or previous aging cycle, NPU 330 may be configured to remove the entry 324 from the forwarding table 322. Otherwise, NPU 330 may take no action with regards to entry 324.

In operation, an NPU may receive a packet from a network entity coupled to or comprising an NPU in distributed switching system 100. For example, NPU 102a may receive a packet from NPU 102h, which originated from a network entity coupled to or comprising NPU 102h. Using the example illustrated in FIG. 2, NPUs 102a and 102h, and the network entity coupled to NPU 102h may both reside in VLAN-C 206. NPU 102a may examine forwarding table 322 to determine whether an entry 324 for the network entity associated with NPU 102h exists. NPU 102a may examine forwarding table 322 for the combination of one or more of the source address 322, port 327, or VLAN 329 associated with the packet. If no entry 324 for the network entity exists in forwarding table 322 corresponding to VLAN-C, then an entry 324 may be created. The network entity associated with NPU 102h may have sent a packet comprising such information as: a source address comprising a MAC address; a port through which the packet was sent; and/or the VLAN through which it was sent. If NPU 102a creates an entry for the network entity associated with NPU 102h, then forwarding table 322 may comprise:

| Address | Port | VLAN | Current Cycle | Previous Cycle |
|---|---|---|---|---|
| 00-12-34-11-22-91 | P1 | VLAN-C | 1 | 1 |
| ... | ... | ... | ... | ... | where the network entity associated with NPU 102h comprises a MAC address of 00-12-34-11-22-91 and the packet was sent over port P2 on VLAN-C. If entry 324 does already exist in forwarding table 322, current cycle bit may also be set to "1." The packet may have a destination of a network entity associated with NPU 102a, or may be have another destination, in which case NPU 102a may forward the packet to another NPU in distributed switching system 100. NPU 102a may continue to repeat these steps as packets arrive, and in parallel to the aging actions in relation to entries 324 in forwarding table 322 as comprised in the description below.

Hardware aging table 310 and software aging table 316 may comprise entries 311, 314 for VLAN-A 202, VLAN-B 204, VLAN-C 206, VLAN-D 208, VLAN-E 210, VLAN-F 212, VLAN-G 214, and VLAN-H 216. In one embodiment, hardware aging table 310 and software aging table 316 may comprise entries 311, 314 for the VLANs for which NPU 102a is a member. Bits 314 and 320 may be initially set to "1." Period 321 may be set for the aging period of a given VLAN. In one embodiment, period 321 may be set by software. For example, if NPU 102a begins operation at a time $t_0$, hardware aging table 310 and software aging table 316 may comprise:

| VLAN | Hardware Aging Table Bit | Software Aging Table Bit | Period (sec.) |
|---|---|---|---|
| VLAN-A | 1 | 1 | 300 |
| VLAN-B | 1 | 1 | 300 |
| VLAN-C | 1 | 1 | 100 |
| VLAN-D | 1 | 1 | 400 |
| VLAN-E | 1 | 1 | 600 |
| VLAN-F | 1 | 1 | 300 |
| VLAN-G | 1 | 1 | 50 |
| VLAN-H | 1 | 1 | 300 |

Hardware timer 308 of NPU 102a may be synchronized with other hardware timers from other NPUs by way of a clock signal 136 from hardware control unit 134. The hardware timer 308 may have a period sufficiently short to accommodate the shortest aging cycle required by any of VLANs 202-216. In one embodiment, hardware timer 308 may have a period of ten seconds. Hardwire timer 308 may reset upon completion of its period.

At the end of its period, hardware timer 308 will notify the other elements of NPU 102a. Bit 314 of hardware aging table 314 may be set to "0" for each VLAN entry 311 upon the end of the period of hardware timer 308. In one embodiment, to prevent the aging action on NPUs in a given VLAN, thus preserving entries 324 in forwarding table 322, bit 314 of hardware aging table 314 may be set to "1" for the given VLAN entry 311. For example, VLAN-B may be configured to not conduct regular aging action, and as such the bit 310 of entry 311 corresponding to VLAN-B in hardware aging table 310 may be fixed at "1."

Upon the end of the period of hardware timer 308, the entries 317 in software aging table 316 may be updated. Entries 317 in software aging table 316 may be updated by instructions or logic contained within memory 304 and executed by processor 302. The entry 317 of a given VLAN may be set to "0" if the period 321 of the entry has been reached. Whether the software aging period 321 has been ended may be determined by the number of iterations of the period of hardware timer 308. If the period of the entry 317 of the given VLAN has not been reached, the entry 317 may be kept at "1."

For example, at time $t_{10}$, 10 seconds after time $t_0$, hardware aging table 310 and software aging table 316 may comprise, assuming that VLAN-B remains configured to avoid aging action:

| VLAN | Hardware Aging Table Bit | Software Aging Table Bit | Period (sec.) |
|---|---|---|---|
| VLAN-A | 0 | 1 | 300 |
| VLAN-B | 1 | 1 | 300 |
| VLAN-C | 0 | 1 | 100 |
| VLAN-D | 0 | 1 | 400 |

(some entries omitted). Thus, at time $t_{10}$, some hardware aging table bits 314 may be set to "0", but software aging table bits 320 may be set to "1", reflecting that the hardware timer 308 has reached the end of its period, but the software-configured period 321 of software aging table 316 has not been reached for any of the VLANs.

Upon the end of the period of hardware timer 308, it may be determined whether aging action is required for a given VLAN. A given VLAN may require aging action if both hardware aging table 310 and software aging table 316 indicate that their respective waiting periods have ended. NPU 102a may process each VLAN in hardware aging table 310 and software aging table 316 to determine whether the VLAN requires aging action. In one embodiment, NPU 102a may determine that aging action for a given VLAN is required if both hardware aging table bit 314 and software aging table 320 are set to "0."

For example, at time $t_{10}$, according to the previous example, no pairs of bits 314, 320 are set to "0" in the hardware and software aging tables for any VLAN. However, at time $t_{300}$, hardware aging table 310 and software aging table 316 may comprise, assuming that VLAN-B remains configured to avoid aging action:

| VLAN | Hardware Aging Table Bit | Software Aging Table Bit | Period (sec.) |
|---|---|---|---|
| VLAN-A | 0 | 0 | 300 |
| VLAN-B | 1 | 0 | 300 |
| VLAN-C | 0 | 0 | 100 |
| VLAN-D | 0 | 1 | 400 |
| ... | | | |

(some entries omitted). Thus, at time $t_{300}$ both hardware aging bit 314 and software aging bit 320 for VLAN-A may be set to "0," thus indicating that aging action should be taken for VLAN-A. At time $t_{300}$, although the period 321 of software aging table 316 has been reached, because the hardware aging bit 314 of VLAN-B has been held at "1," no aging action is taken for VLAN-B. In addition, at time $t_{300}$ both hardware aging bit 314 and software aging bit 320 for VLAN-C may be set to "0," thus indicating that aging action should be taken for VLAN-C.

Upon the end of the period of hardware timer 308, and if so indicated by hardware aging table 310 and software aging table 316, aging action may be taken for a given VLAN. The entries 324 in forwarding table 322 for a given VLAN may be examined to determine whether packets associated with the NPUs associated with entries 324 have been encountered by NPU 102a within the present or previous aging cycle. If no packets have been encountered by NPU 102a within the present or previous aging cycle for a given entry 324, then entry 324 may be removed from forwarding table 322. Otherwise, the aging cycle may end without removing the entry 324. In one embodiment, a "1" in current cycle bit 326 or previous cycle bit 328 may indicate that a packet associated with the VLAN entry 324 was encountered during the current aging cycle or the previous aging cycle, respectively; and a "0" in current cycle bit 326 or previous cycle bit 328 may indicate that a packet associated with the VLAN entry 324 was encountered during the current aging cycle or the previous aging cycle, respectively. In some circumstances, such as upon the addition of a new entry, or for communication with an NPU over a dedicated data link, current cycle bit 326 or previous cycle bit 328 may be set to "1" to prevent premature removal of the entry, even though packets from the NPU may not have been encountered during the respective aging cycles. After bits 326, 328 have been evaluated, previous cycle bit 328 may be assigned the value of current cycle bit 326. Current cycle bit 326 may be assigned the value of "0," wherein current cycle bit 326 may later be assigned the value of "1" as described above if a packet from the associated NPU is encountered during the next aging cycle.

For example, if in the 99 seconds between time $t_0$ and time $t_{99}$, packets are encountered by NPU 102a from network entities associated with NPU 102h and NPU 102i, then at time $t_{99}$ the forwarding table 322 for VLAN-C may comprise:

| Address | Port | VLAN | Current Cycle | Previous Cycle |
|---|---|---|---|---|
| 00-12-34-11-22-91 | P1 | VLAN-C | 1 | 1 |
| 00-03-34-11-22-92 | P2 | VLAN-C | 1 | 1 |
| ... | ... | ... | ... | ... | wherein the network entity associated with NPU 102h comprises the MAC address 00-12-34-11-22-91, and sent a packet through port P1 over VLAN-C, and the network entity associated with NPU 102i comprises the MAC address 00-12-34-11-22-92, and sent a packet through port P1 over VLAN-C. At time $t_{100}$, both hardware aging bit 314 and software aging bit 320 may have a value of "0" for VLAN-C, indicating that aging action may need to be taken by NPU 102a on the forwarding table 322 for VLAN-C. NPU 102a may apply an OR function to current cycle bit 326 and previous cycle bit for NPUs 102h, 102i to determine whether or not each of the entries 324 corresponding to NPUs 102h, 102i should be removed from forwarding table 322. In the present example, because both current cycle bit 326 and previous cycle bit 328 are set to "1," for both NPUs, then the entries 324 may be left in forwarding table 322. Previous cycle bit 328 may be set to "1," the value of current cycle bit 326. Current cycle bit 326 may be set to "0." The aging cycle for VLAN-C may begin again.

At time $t_{200}$ NPU 102a may again take aging action on the forwarding table 322 of VLAN-C. Assuming that NPU 102a encounters no other packets associated with NPU 102h or NPU 102i during the 100 seconds between time $t_{100}$ and $t_{200}$, then at time $t_{2000}$ the forwarding table 322 for VLAN-C may comprise:

| Address | Port | VLAN | Current Cycle | Previous Cycle |
|---|---|---|---|---|
| 00-12-34-11-22-91 | P1 | VLAN-C | 0 | 1 |
| 00-03-34-11-22-92 | P2 | VLAN-C | 0 | 1 |
| ... | ... | ... | ... | ... |

NPU 102a may determine that because packets associated with NPUs 102h, 102i were not encountered during the current cycle, but were encountered during the previous cycle, no entries 324 need to be removed. Previous cycle bit 328 may be assigned "0" for both entries 324, and current cycle bit 326 maintained as "0." The aging cycle for VLAN-C may begin again.

A time $t_{300}$ NPU 102a may again take aging action on the forwarding table 322 of VLAN-C. Assuming that NPU 102a encounters a packet associated with NPU 102h, but does not encounter a packet associated with NPU 102i during the 100 seconds between $t_{200}$ and $t_{300}$, then at time $t_{300}$ the forwarding table 322 for VLAN-C may comprise:

| Address | Port | VLAN | Current Cycle | Previous Cycle |
|---|---|---|---|---|
| 00-12-34-11-22-91 | P1 | VLAN-C | 1 | 0 |
| 00-03-34-11-22-92 | P2 | VLAN-C | 0 | 0 |
| ... | ... | ... | ... | ... |

NPU 102a may determine that because a packet associated with NPU 102h was encountered in the current or previous cycle, then the entry 324 corresponding to NPU 102h may be maintained. The previous cycle bit 328 may be assigned the "1" of current cycle bit 326, and the current cycle bit 326 assigned a "0." NPU 102a may determine that because no packet associated with NPU 102i was encountered in either the current or previous cycle, then the entry 324 corresponding to NPU 102i may be removed. Thus, after $t_{300}$ the forwarding table 322 for VLAN-C may comprise:

| Address | Port | VLAN | Current Cycle | Previous Cycle |
|---|---|---|---|---|
| 00-12-34-11-22-91 | P1 | VLAN-C | 0 | 1 |
| ... | ... | ... | ... | ... |

Figure 4:
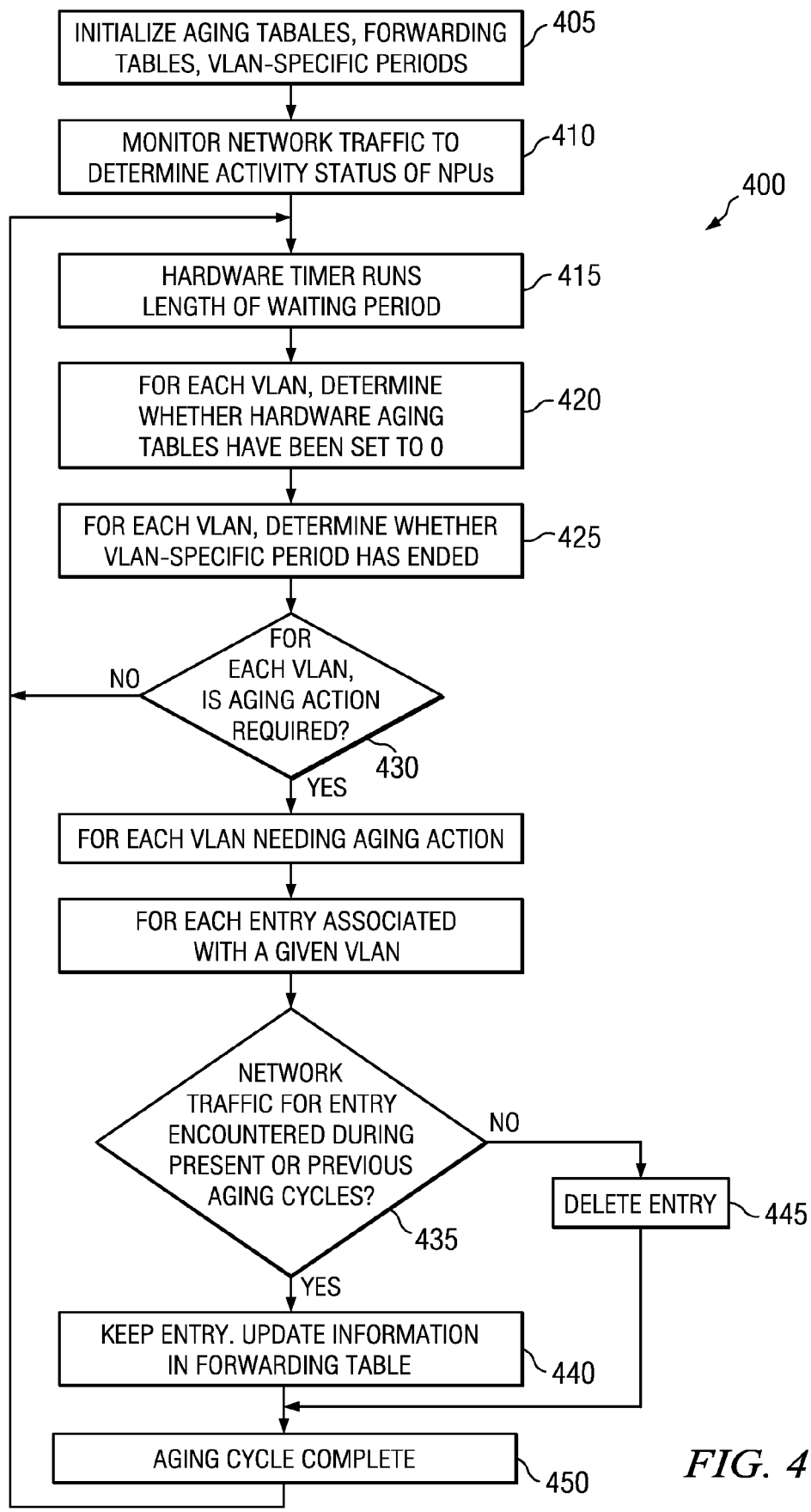
FIG. 4 is an illustration of an example method for software-assisted 1-bit per VLAN aging timer scheme for distributed switching systems.

FIG. 4 is an illustration of an example method 400 for software-assisted 1-bit per VLAN aging timer scheme for distributed switching systems. In step 405, any aging tables and forwarding tables for use in method 400 may be initialized. Aging tables may be set to indicate that hardware-based timing periods have not concluded, and that software-assisted, VLAN-specific timing periods have not concluded. VLAN-specific timing periods may be configured for the VLANs in the distributed switching system. In step 410, network traffic may be monitored to determine the activity status of one or more network entities associated with one or more NPUs in a distributed switching system. The activity status of the one or more network entities may be stored in one or more forwarding tables. Step 410 may be conducted in parallel with steps 415-450. Step 410 may comprise the steps of method 500 of FIG. 5.

Figure 5:
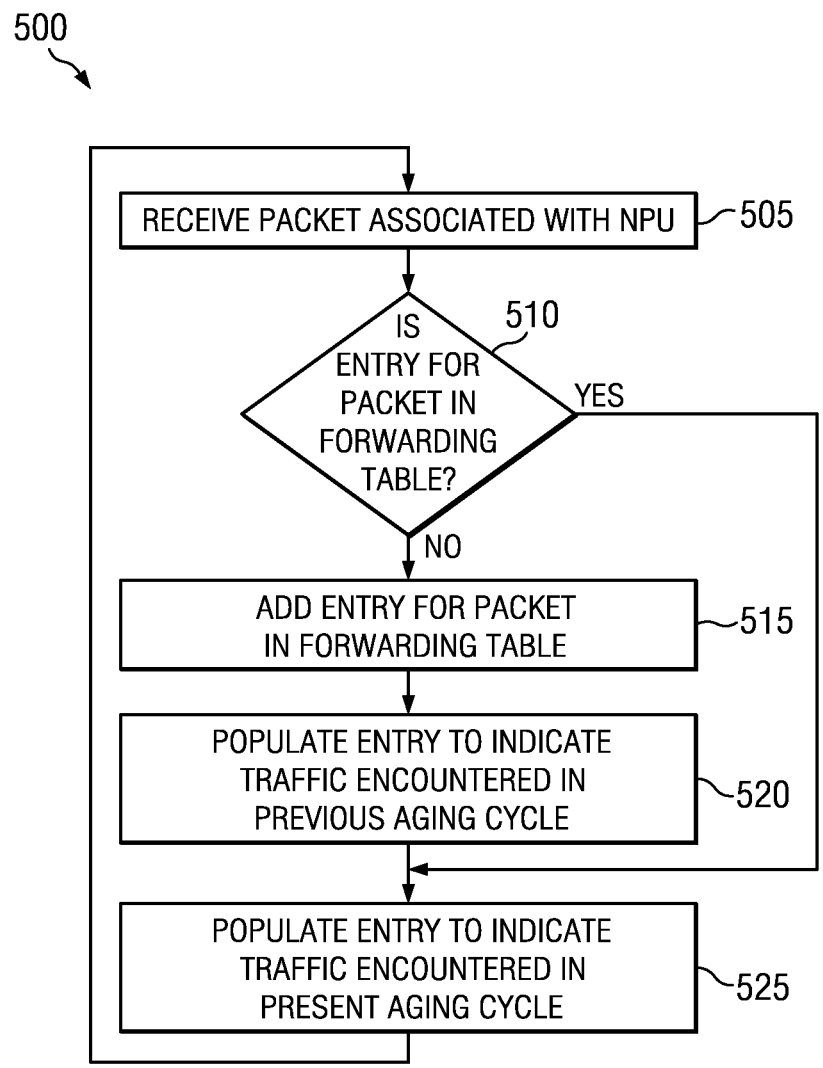
FIG. 5 is an illustration of an example method for monitoring packets and updating a forwarding table.

FIG. 5 is an illustration of an example method 500 for monitoring packets and updating a forwarding table. In step 505, a packet may be received. The packet may be associated with a network entity coupled to or comprising an NPU. The packet may have been sent from a source address through a port over a VLAN. In step 510, it may be determined whether an entry exists in the forwarding table for the source information associated with the packet, including a combination of one or more of the source address, port, or VLAN. If an entry for the source of the packet in the forwarding table, then method 500 may proceed to step 525. If the source of the packet is not present in the forwarding table, then in step 515 an entry for the source of the packet may be added to the forwarding table. In step 520, the entry for the source of the packet may be populated so as to indicate that network traffic from the source of the packet was encountered in a previous aging cycle. In step 525, the entry for the source of the packet may be populated as to indicate that network traffic from the source of the packet was encountered in the present aging cycle.

Returning to FIG. 4, in step 415, a waiting period may commence based upon a hardware timer. At the end of each such waiting period, it may be determined whether one or more VLANs in the distributed switch system are ready to be processed to determine whether information associated with the NPUs comprising the one or more VLANs is sufficiently old to be discarded. In step 420, for each VLAN it may be determined whether the hardware timer has expired, and whether each VLAN is configured to be processed in such a manner described above. In one embodiment, step 420 may comprise utilizing a hardware aging table. In such an embodiment, a hardware aging table for a VLAN may be set to "0" to indicate that the hardware timer period has ended, and that the associated VLAN is configured to be processed. In such an embodiment, a hardware aging table for a VLAN may be set to "1" to indicate that the hardware timer period has not ended. In a further embodiment, a hardware aging table for a VLAN may be held at "1," even though the hardware timer period has ended, to indicate that the VLAN is not configured to be processed, thus preventing the processing of the VLAN.

Parallel to step 420, in step 425 for each VLAN it may be determined whether a waiting period specific to the VLAN has been reached. In one embodiment, step 425 may comprise updating a software aging table with an indication of whether the waiting period specific to the VLAN has been reached. In such an embodiment, step 425 may set the software aging table with "0" if the waiting period has been reached, and with "1" if the waiting period has not been reached.

In step 430, for each VLAN it may be determined whether aging action needs to be taken. Step 430 may comprise determining whether both step 420 indicated the hardware timer had expired and the VLAN is configured to be processed, and step 435 indicated that the VLAN-specific waiting period had been reached. If not, aging action may not need to be taken for the given VLAN, and the method may proceed to step 415. If so, then aging action may need to be taken.

In step 435, aging action may be taken for each VLAN identified in step 430. Each VLAN may be associated with a forwarding table comprising information associated with one or more network entities in the distributed switching system. In one embodiment, a single forwarding table may be used to store information for all VLANs. For each entry in the forwarding table associated with a given VLAN, it may be determined whether network traffic associated with the network entity associated with the entry has been encountered in the present or previous aging cycle. If network traffic associated with the given entry has been encountered in the present or previous aging cycle, then in step 440 entry may remain in the forwarding table. Information about whether network traffic associated with the network entity associated with the entry has been encountered in the present or previous aging cycle may be stored in bits, or in any another suitable manner, in the entry in the forwarding table. The entry may be updated in step 440 to prepare for a subsequent aging cycle, by assigning the indication of the present aging cycle to the previous aging cycle, and by resetting the indication of the present aging cycle. If network traffic from the network entity has not been encountered in the present or previous aging cycle, then in step 445 the entry may be removed from the forwarding table. In step 450, an aging cycle may be complete. Another aging cycle may be initiated by returning to step 415.

In one embodiment, steps 415-450 may be conducted together for each VLAN. In another embodiment, steps 415-450 may execute independently for each VLAN. In yet another embodiment, steps 415-450 may execute in a mixture of these two approaches.

Although FIGS. 4, 5 disclose a particular number of steps to be taken with respect to example methods 400, 500, methods 400, 500 may be executed with more or fewer steps than those depicted in FIGS. 4-5. In addition, although FIGS. 4-5 disclose a certain order of steps to be taken with respect to methods 400, 500, the steps comprising method 400, 500 may be completed in any suitable order.

Methods 400, 500 may be implemented using the system of FIGS. 1-2, the NPU of FIG. 3, or any other system, network, or device operable to implement methods 400, 500. In certain embodiments, methods 400, 500 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other tangible, non-transitory media; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A network processing unit, comprising:
   a first table comprising a first entry for a network, the first entry comprising a network aging period associated with the network, the network comprising the network processing unit;
   a forwarding table associated with the network, the forwarding table comprising a second entry, the second entry associated with a first network entity and comprising an indication of whether network traffic associated with the first network entity has been encountered in a current network aging period or a previously expired network aging period; and
   a processor; wherein:
      the processor is configured to receive an indication from a hardware timer that a hardware aging period has ended;
      upon receiving the indication from the hardware timer, the processor is configured to determine, for one or more networks, whether the network aging period has ended;
      if the network aging period for a given network has ended, the processor is configured to determine, for one or more first network entities listed in the forwarding table associated with the given network, whether traffic associated with the first network entity has been encountered in a current network aging period or a previously expired network aging period;
      if traffic associated with the first network entity has not been encountered in either a current network aging period or a previously expired network aging period, then the processor is configured to remove the first network entity from the forwarding table.

2. The network processing unit of claim 1, wherein the network processing unit comprises the hardware timer.

3. The network processing unit of claim 1, wherein the hardware timer is synchronized with one or more other network processing units within a distributed switching system.

4. The network processing unit of claim 1, further comprising a second table comprising a third entry associated with the network, the third entry comprising a bit configurable to control whether the processor will determine whether traffic associated with the first network entity has been encountered in a current network aging period or a previously expired network aging period.

5. The network processing unit of claim 4, wherein:
   aging action comprises determining, for one or more first network entities listed in the forwarding table associated with the given network, whether traffic associated with the first network entity has been encountered in a current network aging period or a previously expired network aging period;
   the network processing unit further comprises a memory;
   the first entry further comprises a first bit, the bit operable to be set by instructions stored in the memory, the bit comprising an indication that the network aging period has been completed;
   the third entry further comprises a second bit, the bit operable to be set by hardware coupled to the hardware timer, the bit comprising an indication that the hardware aging period has been completed and whether aging action is to be taken on the forwarding table of an associated network;
   the processor is configured to conduct aging action on the forwarding table if the first bit and second bit have been set.

6. The network processing unit of claim 5, wherein:
   the second entry further comprises a third bit comprising an indication that traffic associated with the first network entity has been encountered in a current network aging period;
   the second entry further comprises a fourth bit comprising an indication that traffic associated with the first network entity has been encountered in a previously expired network aging period; and
   at an end of an aging period, the processor is configured to assign a value of the third bit to the fourth bit, and to reset the third bit.

7. The network processing unit of claim 1, wherein the processor is further configured to:
   receive data packets from a second network entity; and
   populate the forwarding table with information associated with the second network entity.

8. A method for networked communications, comprising:
   receiving an indication on a computing system from a hardware timer that a hardware aging period has ended;
   upon receiving the indication from the hardware timer, accessing a first table through the computing system to determine, for one or more networks, a network aging period associated with a network, the first table including a first entry, the first entry including the network aging period;
   if the network aging period for a given network has ended, determining through the computing system, for one or more first network entities listed in a forwarding table associated with the given network, whether traffic associated with the first network entity has been encountered in a current network aging period or a previously expired network aging period, the forwarding table comprising a second entry; and
   if traffic associated with the first network entity has not been encountered in either a current network aging period or a previously expired network aging period, then removing through the computing system the first network entity from the forwarding table.

9. The method of claim 8, wherein the hardware timer is synchronized with one or more other hardware timers within a distributed switching system.

10. The method of claim 8, further comprising:
accessing through the computing system a second table, the second table comprising an entry associated with a given network; and,
determining from the second table whether for the given network to:
if the network aging period for a given network has ended, determining through the computing system, for one or more first network entities listed in a forwarding table associated with the given network, whether traffic associated with the first network entity has been encountered in a current network aging period or a previously expired network aging period, the forwarding table comprising a second entry; and
if traffic associated with the first network entity has not been encountered in either a current network aging period or a previously expired network aging period, then removing through the computing system the first network entity from the forwarding table.

11. The method of claim 10, further comprising:
setting through the computing system a first bit in the first entry, the first bit comprising an indication that the network aging period has been completed;
determining through the computing system whether a second bit in a third entry has been set, the second bit comprising an indication that the hardware aging period has been completed and whether aging action is to be taken on the forwarding table of an associated network; and
conducting aging action through the computing system on the forwarding table if the first bit and second bit have been set; wherein
conducting aging action on the forwarding table further comprises, for one or more first network entities listed in the forwarding table associated with the given network, determining whether traffic associated with the first network entity has been encountered in a current network aging period or a previously expired network aging period.

12. The method of claim 11, further comprising:
at an end of a network aging period, assigning through the computing system a value of a third bit to a fourth bit; wherein
the second entry further comprises the third bit comprising an indication whether traffic associated with the first network entity has been encountered in a current network aging period; and
the second entry further comprises the fourth bit comprising an indication whether traffic associated with the first network entity has been encountered in a previously expired network aging period.

13. The method of claim 8, further comprising:
receiving through the computing system data packets from a second network entity; and
populating through the computing system the forwarding table with information associated with the second network entity.

14. An article of manufacture comprising:
a non-transitory computer readable medium; and
computer-executable instructions carried on the non-transitory computer readable medium, the instructions readable by a processor, the instructions, when read and executed, for causing the processor to:
receive an indication from a hardware timer that a hardware aging period has ended;
upon receiving the indication from the hardware timer, access a first table to determine, for one or more networks, a network aging period associated with a network, the first table including a first entry, the first entry including the network aging period;
if the network aging period for a given network has ended, determine, for one or more first network entities listed in a forwarding table associated with the given network, whether traffic associated with the first network entity has been encountered in a current network aging period or a previously expired network aging period, the forwarding table comprising a second entry; and
if traffic associated with the first network entity has not been encountered in either a current network aging period or a previously expired network aging period, then remove the first network entity from the forwarding table.

15. The article of claim 14, wherein the hardware timer is synchronized with one or more other hardware timers within a distributed switching system.

16. The article of claim 14, wherein the processor is further caused to:
access a second table, the second table comprising an entry associated with a given network; and,
determine from the second table whether for the given network to conduct:
if the network aging period for a given network has ended, determine, for one or more first network entities listed in a forwarding table associated with the given network, whether traffic associated with the first network entity has been encountered in a current network aging period or a previously expired network aging period, the forwarding table comprising a second entry; and
if traffic associated with the first network entity has not been encountered in either a current network aging period or a previously expired network aging period, then remove the first network entity from the forwarding table.

17. The article of claim 16, wherein the processor is further caused to:
set a first bit in the first entry, the first bit comprising an indication that the network aging period has been completed;
determine whether a second bit in a third entry has been set, the second bit comprising an indication that the hardware aging period has been completed and whether aging action is to be taken on the forwarding table of an associated network; and
conduct aging action on the forwarding table if the first bit and second bit have been set; wherein
conducting aging action on the forwarding table further comprises causing the processor to, for one or more first network entities listed in the forwarding table associated with the given network, determining whether traffic associated with the first network entity has been encountered in a current network aging period or a previously expired network aging period.

18. The article of claim 17, wherein the processor is further caused to:
at an end of an aging period, assign a value of a third bit to a fourth bit; and
wherein:
the second entry further comprises the third bit comprising an indication whether traffic associated with the first network entity has been encountered in a current network aging period; and the second entry further comprises the fourth bit comprising an indication whether traffic associated with the first network entity has been encountered in a previously expired network aging period.

19. The article of claim 14, wherein the processor is further caused to:
receive data packets from a second network entity; and
populate the forwarding table with information associated with the second network entity.

20. The article of claim 14, wherein the processor is further caused to calculate the network aging period in terms of the hardware aging period.

\* \* \* \* \*